Aug. 5, 1958 — A. V. BROGREN — 2,845,816
LEVER STRUCTURE
Filed Nov. 15, 1954
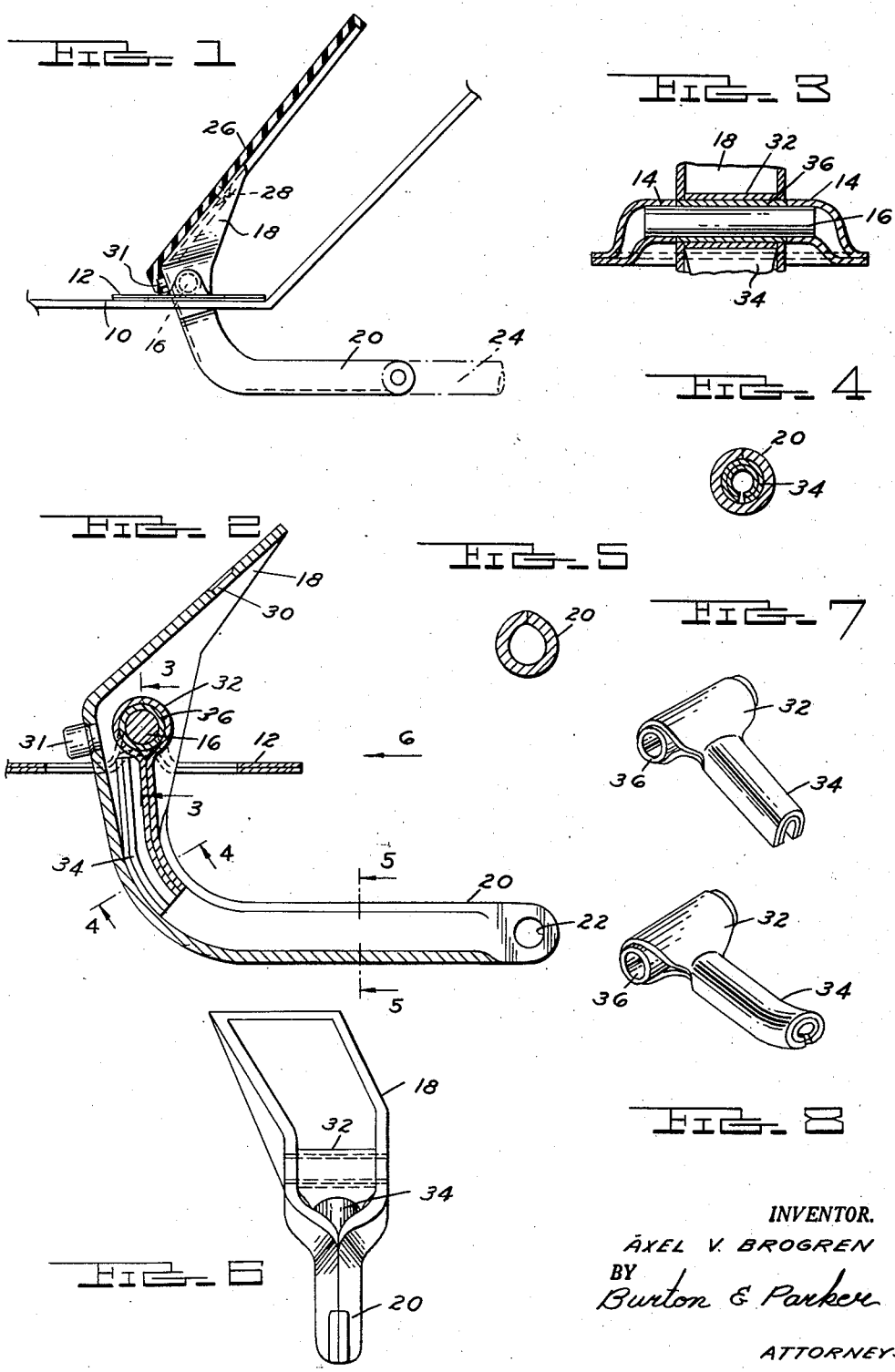
INVENTOR.
AXEL V. BROGREN
BY Burton & Parker
ATTORNEYS United States Patent Office 2,845,816
Patented Aug. 5, 1958

2,845,816

LEVER STRUCTURE

Axel V. Brogren, Detroit, Mich., assignor to Parsons Corporation, Detroit, Mich., a corporation of Michigan Application November 15, 1954, Serial No. 468,801

4 Claims. (Cl. 74—519)

This invention relates to an improved lever structure and particularly one of the bell crank or pedal type.

An object is to provide an improved lever device of the character set forth which is formed of sheet metal, is of simple inexpensive construction, and is strong and rugged and which is particularly adapted for the use for which it is intended.

More particularly an object is the provision of an improved bell crank lever particularly designed to serve as part of a pedal structure such as an accelerator pedal for a motor vehicle wherein one arm of the bell crank lever serves as the support for the tread or foot rest portion of the pedal and the other arm of the lever is coupled with operating linkage adapted to respond to pedal movement.

More specifically my improved bell crank lever structure is formed of two sheet metal parts so associated together as to provide a particularly strong and rugged bell crank lever device. Each part is formed of a piece or strip of sheet metal. Each piece or strip of sheet metal is bent upon itself so that one strip forms the outer part of the bell crank lever and the other strip forms the inner strip thereof. The two parts are so shaped that the inner part may be snugly received or nested within the base of the outer part and provides a particularly strong and rugged combined structure.

One strip of sheet metal is bent to determine the general shape and outer part of the bell crank lever. It is provided with a pivot pin opening adjacent to the juncture of the two arms and at one end of the bottom of the U shape to receive a pivot pin upon which the lever is pivoted. The pivot pin itself is supported within a mounting or floor plate which serves to support the bell crank lever for swinging movement. The other piece or strip of sheet metal is shaped to encircle the pivot pin and to be seated or nested within that portion of the U shape itself which is commonly termed the bottom or base of the U shape and to extend substantially into one arm of such U shape. Such other part includes a pivot pin bushing held grippingly by the part against rotation therein and rotatably encircling the pivot pin. Such part together with the bushing provides a suitable mounting for the pivot pin and reinforces and strengthens the base of the outer part of the bell crank lever. The two parts so associated form a strong and rugged bell crank lever.

Other objects, advantages, and meritorious features will more fully appear from the following description, claims, and accompanying drawing, wherein:

Fig. 1 is a fragmentary section through a part of the floor of a motor vehicle showing a bell crank shaped lever pivotally supported therein and embodied in what might be the accelerator pedal;

Fig. 2 is a sectional view through the bell crank lever itself showing the relationship of the inner and outer parts thereof;

Fig. 3 is a sectional view taken on the line 3—3 of Fig. 2;

Fig. 4 is a sectional view taken on the line 4—4 of Fig. 2;

Fig. 5 is a sectional view taken on the line 5—5 of Fig. 2;

Fig. 6 is a fragmentary elevation of a lever embodying the invention but slightly modified as compared with the construction shown in the first five figures of the drawing;

Fig. 7 is a perspective of the inner part of the bell crank lever assembly at an intermediate stage in its fabrication;

Fig. 8 is a similar perspective of the inner part of the bell crank lever assembly in the form it would be in after it has been fully shaped within the outer part.

Heretofore bell crank levers of this character have been formed of castings or in any other suitable manner. The instant construction possesses advantages of manufacture, lightness, strength, and cheapness, which give it advantages for the use in question. While it is shown as embodied in a bell crank lever device for an accelerator pedal of a motor vehicle, it is obvious that the lever structure might be used in any place wherein it was suitable for use. As shown, it is supported upon a floor portion 10 of a vehicle. Resting upon such floor portion is a floor plate or mounting plate 12 which mounting plate swingably supports the bell crank lever. The mounting plate is shown as formed of two pieces of sheet metal juxtaposed and secured together and suitably nested and shaped as shown in Fig. 3 to define a pair of opposed sockets or bearing brackets 14 adapted to receive opposite ends of a pivot pin or pintle 16. Such pin is held against rotation between the juxtaposed floor plate pieces. The bell crank lever which I have provided is journaled upon the pivot pin 16 for rockable movement. My invention relates not to the floor plate or to the pivot pin as separate elements but to the bell crank lever structure itself.

Such bell crank lever structure is formed out of two pieces or strips of suitable sheet metal. One of these strips is so shaped as to form an outer part of the bell crank assembly and the other strip is so shaped as to form an inner part for the bell crank assembly. The strip or piece of sheet metal which is shaped to form the outer part of the assembly is bent into a generally U shape which is a common bell crank form. The metal of which one arm of the U is formed is bent upon itself to form an arm 18 which is shown as channel-shaped in cross section. The metal of which the other arm 20 of the U is formed is bent upon itself into a generally tubular shape. Such is shown in Figs. 1, 2, and 6. Fig. 6 differs from Figs. 1 and 2 only in that the outer portion of the channel-shaped arm is slightly offset or bent at an angle to the remaining portion of the U shape. In Figs. 1 and 2 the two arms are not offset relatively with respect to each other but are disposed in the same plane.

The arm which is channel-shaped in cross section has its side walls of increasing width as they extend away from the outer end of the arm until they reach a maximum width at the base of the arm and from which maximum width they merge into the tubular arm 20 as shown particularly in Fig. 6. It will be seen that the channel-shaped arm and the tubular arm merge within the base of the U shape and that the tubular arm is formed by the rolling of the sheet metal which constitutes such arm upon itself forming a tube which is closed at its outer end. This outer end is shown as apertured as at 22 to provide a connection for any suitable linkage as indicated at 24 in Fig. 1.

The bottom of the channel-shaped arm 18 has its outer face disposed within a plane as shown so as to be adapted to receive a tread or foot rest part of any suitable character as indicated by the numeral 26. Such part may be secured thereto as shown in Fig. 1 by having a rivet or connection 28 extending through the aperture 30 in the arm and connected with the tread and by having the base of the tread engaged over the base of such arm and about a lug 31 carried by the arm. The securement of this tread or foot rest portion to the arm forms no part of this invention.

The inner part of the bell crank lever is formed by a piece or strip of sheet metal which is bent transversely upon itself intermediate its opposite ends forming a generally cylindrically pivot pin bushing receiving portion 32. The opposite ends of this strip are rolled longitudinally upon themselves forming two channel-shaped plies one of which is adapted to be nested within the other to form a two-ply arm 34. This channel shape is shown in Fig. 7. It represents an intermediate stage in the shaping of the inner portion. The two channels which make up the arm 34 are sprung apart normally as shown in Fig. 7 and within the cylindrical portions 42, a pivot pin bushing 36 is mounted.

When the two channels are brought together, the cylindrical portion is grippingly tightened about the bushing 36 holding the bushing against rotation. The ends of the bushing extend beyond the ends of the cylindrical part 32 and when this inner portion is mounted within the outer portion, these projecting ends of the bushing extend through the openings in the side walls of the channel-shaped arm 20 as shown in Fig. 3. The arm 34 of the inner part is disposed within the arm 20 of the outer part.

In the fabrication of this bell crank lever the inner part would be disposed within the outer part before the arm 20 was rolled up as shown in Fig. 6. The two arms of the two parts which are nested together would be rolled up together to the form shown in Figs. 2 and 6. The tubular arm 34 of the inner part has its seam disposed 180° from the seam of the arm 20 of the outer part as shown. When the bell crank lever is completely shaped, the bushing is held against rotation so that the bushing revolves upon the pivot pin. The pivot pin is also held against rotation within the mounting plate.

The arm 34 of this inner part extends through the base of the U-shaped outer part as shown in Fig. 2. It extends into the tubular arm of the U-shaped outer part. It is bent slightly as shown in Fig. 2 as it extends into the end of the tubular arm of the outer part adjacent to the base of the U. The bell crank lever is therefore reinforced through the base of the U.

What I claim is:

1. A unitary bell crank lever formed of two sheet metal pieces, one sheet metal piece being bent into a generally U shape and constituting the outer part of the bell crank lever and having one arm of the U shape wherein the sheet metal is bent into a generally channel shape in cross section and having the other arm of the U shape wherein the sheet metal is folded upon itself into a generally tubular shape in cross section, said channel-shaped arm and said tubular-shaped arm each extending into the base of the U and merging with each other within the base of the U, the other sheet metal piece being in the form of a strip bent transversely intermediate its ends upon itself providing at the transverse bend a pivot pin bushing bearing receiving cylindrical portion and having both ends brought into overlapping relationship and forming an arm portion extending outwardly radially away from the pivot pin bushing receiving portion, said other sheet metal piece so bent being disposed within the outer part so as to constitute the inner part of the bell crank lever, said inner part being nested within the base of the U shape of the outer part with the pivot pin bushing bearing receiving portion disposed between the two side walls of the channel-shaped arm extension into the base of said outer part, said two side walls of the channel-shaped arm extension of the outer part being apertured providing pivot pin bushing apertures registering with opposite ends of the pivot pin bushing bearing receiving portion of the inner part, and a pivot pin bushing bearing disposed within the pivot pin bushing bearing receiving portion of the inner part and projecting beyond the ends of the bushing bearing receiving portion of the inner part and into said registering apertures of the side walls of the outer part forming a pin receiving bearing for the two part unitary bell crank lever.

2. A bell crank lever formed of two sheet metal pieces, one sheet metal piece being bent into a generally U shape and constituting the outer part of the bell crank lever and having one arm of the U shape wherein the sheet metal is bent into a generally channel shape in cross section and having the other arm of the U shape wherein the sheet metal is folded upon itself into a generally tubular shape in cross section, said channel-shaped arm and said tubular-shaped arm each extending into the base of the U and merging into each other within the base of the U, the two side walls of the channel shape provided with aligned pivot pin bushing apertures, said other sheet metal piece being in the form of a strip bent transversely upon itself intermediate its ends forming a transversely extending cylindrical pivot pin bushing receiving bearing portion and having its ends brought into juxtaposition and rolled longitudinally upon themselves into a generally tubular shape forming a tubular arm projecting radially away from the pivot pin bushing receiving portion, said other piece so shaped constituting an inner part of the bell crank lever and received within the base of the outer part of the bell crank lever with the cylindrical pivot pin bushing receiving portion of the inner part disposed within and between the side walls of the channel-shaped arm of the outer part and with the cylindrical bushing receiving portion aligned with the apertures through the side walls of the outer part and with the tubular arm of the inner part extending through and nested within the base of the outer part and projecting into the tubular arm of the outer part, and a pivot pin bushing bearing disposed within the pivot pin bushing bearing receiving portion of the inner part and projecting beyond the ends thereof into the apertures through the side walls of the outer part, the seam of the tubular arm portion of the inner part being disposed substantially 180° opposite from the seam of the tubular arm of the outer part.

3. A bell crank lever of a generally U-shaped contour providing a base portion and two arm portions and comprising an inner part and an outer part, said outer part being formed of sheet metal bent into a generally U-shaped contour and having one arm wherein the sheet metal is bent into a channel shape in cross section adjacent to the base of the U-shape contour and which channel shape extends into said base, the other arm of the U-shaped contour folded lengthwise upon itself into a generally tubular shape in cross section, a tubular pivot pin bushing disposed within the base portion and extending between and through the side walls of the channel-shaped part of said base forming a bearing for a pivot pin, said inner part of the bell crank lever being formed of a strip of sheet metal folded transversely upon itself providing at the bend a cylindrical pivot pin bushing receiving portion and having its ends brought into overlapping relationship forming an arm portion extending outwardly away from the cylindrical pivot pin bushing receiving portion, said inner part being disposed within the channel base of the outer part with the cylindrical pivot pin bushing receiving portion thereof disposed between and spacing the side walls of the channel-shaped portion of the outer part apart and encircling the pivot pin bushing grippingly holding the same against rotation within the bell crank lever, said arm portion of the inner part folded lengthwise upon itself and extending into the tubular shaped arm of the outer part and held in overlapped folded relationship thereby grippingly about the pivot pin bushing holding the bushing against rotation within the bushing receiving portion, said pivot pin bushing adapted to serve as a bearing for a pivot pin extending therethrough and upon which the bell crank lever may be rockably supported.

4. A bell crank lever of the character described comprising, in combination, an outer part and an inner part, said outer part being formed of sheet metal bent into a generally U-shaped contour having a base and two arms, a portion of the base adjacent to one arm being channel-shaped in cross section, the opposite arm of the U-shaped contour being folded lengthwise upon itself, a cylindrical pivot pin bushing mounted within said channel-shaped portion of the base adjacent to the first mentioned arm and extending through and between the side walls of the channel-shaped portion of the base forming a bearing for a pivot pin adapted to support the lever, said inner part formed of a sheet metal strip folded transversely upon itself forming at the bend a cylindrical pivot pin bushing receiving portion and forming a two-play arm portion extending outwardly away from the pivot pin bushing receiving portion, said inner part disposed within the channel-shaped base of the outer part with the cylindrical pivot pin bushing receiving portion thereof encircling the pivot pin bushing holding the same against rotation within the side walls of the outer part, said two play arm of the inner part extending across the base and into the arm of the outer part which is folded lengthwise upon itself, said pivot pin bushing adapted to serve as a bearing for a pivot pin upon which the bell crank lever may be rockably supported.

References Cited in the file of this patent

UNITED STATES PATENTS

| | | |
|---|---|---|
| 837,781 | Block | Dec. 4, 1906 |
| 1,208,338 | Levedahl | Dec. 12, 1916 |
| 1,506,157 | Brainard | Aug. 26, 1924 |
| 1,538,572 | Miller | Dec. 19, 1925 |
| 1,735,024 | Toncray | Nov. 12, 1929 |
| 1,911,113 | Fry | May 23, 1933 |
| 1,936,237 | Johnson | Nov. 21, 1933 |
| 2,532,189 | Pinardi et al. | Nov. 28, 1950 |